(12) United States Patent
McDaniel et al.

(10) Patent No.: US 8,568,269 B2
(45) Date of Patent: Oct. 29, 2013

(54) LINEARLY ADJUSTABLE TORQUE TRANSMISSION SYSTEMS AND METHODS

(75) Inventors: Andrew Joseph McDaniel, Chapel Hill, NC (US); Christopher Wayne Vaughn, Mebane, NC (US)

(73) Assignee: Honda Motor Co., Ltd., Tokyo (JP)

( * ) Notice: Subject to any disclaimer, the term of this patent is extended or adjusted under 35 U.S.C. 154(b) by 1137 days.

(21) Appl. No.: 11/868,347

(22) Filed: Oct. 5, 2007

(65) Prior Publication Data

US 2008/0110689 A1    May 15, 2008

Related U.S. Application Data

(60) Provisional application No. 60/849,725, filed on Oct. 5, 2006.

(51) Int. Cl.
*F16H 15/10* (2006.01)
(52) U.S. Cl.
USPC .............................................. 476/57; 384/43
(58) Field of Classification Search
USPC ................. 476/55, 56, 57, 58; 384/43, 45
See application file for complete search history.

(56) References Cited

U.S. PATENT DOCUMENTS

| | | | | | |
|---|---|---|---|---|---|
| 1,381,247 | A | * | 6/1921 | Simpson | 476/57 |
| 1,397,296 | A | * | 11/1921 | Schaf, Jr. et al. | 476/57 |
| 1,766,266 | A | * | 6/1930 | Stracke | 476/57 |
| 2,945,366 | A | * | 7/1960 | Sears | 464/168 |
| 3,530,729 | A | * | 9/1970 | Nusz | 476/58 |
| 4,270,400 | A | * | 6/1981 | Fodor | 476/58 |
| 4,406,502 | A | * | 9/1983 | Teramachi | 384/45 |
| 4,629,337 | A | * | 12/1986 | Teramachi | 384/43 |

* cited by examiner

*Primary Examiner* — William C Joyce
(74) *Attorney, Agent, or Firm* — Jenkins, Wilson, Taylor & Hunt, P.A.

(57) ABSTRACT

Linearly adjustable torque transmission systems and methods for a power driven machine are provided. The system can include a first wheel adapted to be rotatably driven. The system can further include a second wheel positioned proximate the first wheel that can engage the first wheel such that rotational movement of the first wheel can impart rotational movement to the second wheel. The second wheel can be coupled to a shaft with bearings between the second wheel and the shaft such that the second wheel is movable along the shaft in a lateral direction while the second wheel is coupled to the shaft wherein rotational movement of the second wheel rotationally moves the shaft.

13 Claims, 8 Drawing Sheets

LINEARLY ADJUSTABLE TORQUE TRANSMISSION SYSTEMS AND METHODS

RELATED APPLICATIONS

The presently disclosed subject matter claims the benefit of U.S. Provisional Patent Application Ser. No. 60/849,725, filed Oct. 5, 2006, the disclosure of which is incorporated herein by reference in its entirety.

TECHNICAL FIELD

The subject matter described herein relates to transmission systems and methods. More specifically, the present subject matter relates to linearly adjustable torque transmission systems and methods for powered equipment.

BACKGROUND

A variety of transmission systems and methods exist for powered equipment such as, for example, mowers, tillers, snowmobiles, and other motor-driven apparatuses. Continuously variable transmission (CVT) systems, also known as infinitely variable transmission systems, can be used to continuously vary the transmission ratio and can provide both forward and reverse drive operations with speed control. CVT systems can be friction CVT systems, hydrostatic CVT systems or ratcheting CVT systems. Friction CVT systems can include a variable speed first wheel that can be a pulley that can be rotated, directly or indirectly, by an engine motor. A second wheel can be laterally movable along a shaft and positioned orthogonally with respect to the first wheel. The second wheel can frictionally engage the first wheel such that rotational movement of the first wheel, as driven by the motor, causes rotational movement of the second wheel. The second wheel can be coupled to the shaft such that rotational movement of the second wheel causes rotational movement of the shaft. An axle to which tires are attached can be interconnected to the shaft such that rotational movement of the shaft rotationally moves the tires. The ability of the second wheel to move laterally on the shaft allows the second wheel to engage the first wheel at different locations to thereby control the speed of the tires in a forward or reverse drive operation.

Up to now, the shaft of such systems has had to be of a shape other than round, for example such as hexagonal, in order to transmit torque from the rotatably driven second wheel to the shaft. A rubber edged disk has been used with a centrally positioned bore of a shape, such as hexagonal, to couple with the shaft to allow lateral movement of the second wheel and prevent rotational movement of the second wheel on the shaft.

In light of the above, there remains room for improvement in linearly adjustable torque transmission systems and methods.

SUMMARY

The subject matter described herein discloses linearly adjustable torque transmission systems and methods for powered equipment, as described in detail hereinbelow.

It is therefore an object of the present disclosure to provide novel linearly adjustable torque transmission systems and methods for powered equipment. An object having been stated, and which is achieved at least in whole or in part by the present disclosure, other objects may become apparent in light of the description provided herein.

BRIEF DESCRIPTION OF THE DRAWINGS

The foregoing features and advantages of the present subject matter will be apparent from the following more particular description of preferred embodiments of the present subject matter, as illustrated in the accompanying drawings in which like reference characters refer to the same parts throughout the different views. The drawings are not necessarily to scale, emphasis instead being placed upon illustrating the principles of the subject matter disclosed. The subject matter described herein will now be explained with reference to the accompanying drawings of which.

DETAILED DESCRIPTION

Reference will now be made in detail to the present subject matter, one or more examples of which are shown in the various figures. Each example is provided to explain the subject matter and not as a limitation. In fact, features illustrated or described as part of one embodiment can be used in another embodiment to yield still yet another embodiment. It is intended that the present subject matter cover such modifications and variations.

Figure 1:
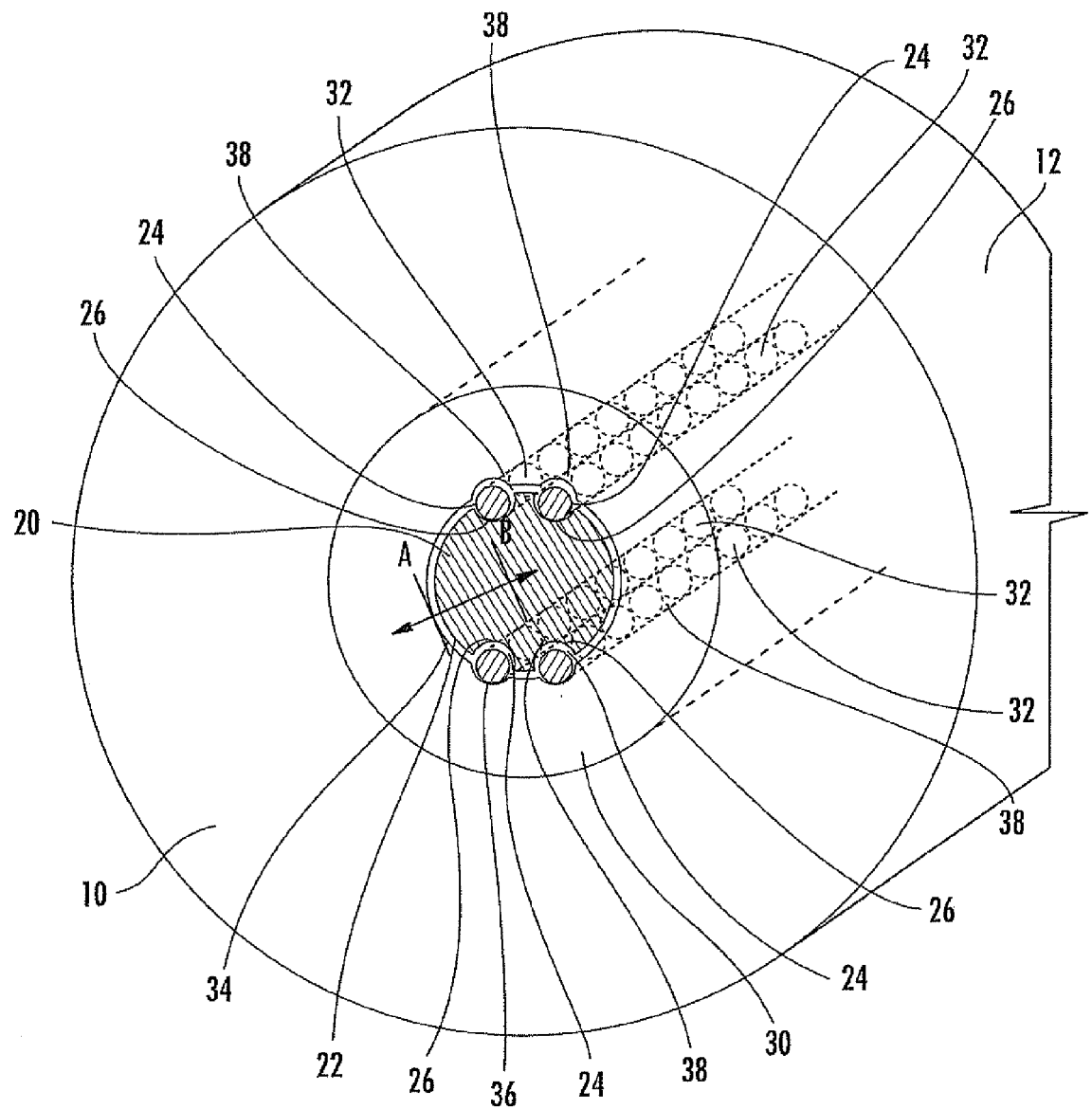
FIG. 1 illustrates a cross sectional perspective view of a transmission wheel for use within a continuously variable transmission "CVT" system according to the present disclosure.

FIG. 1 illustrates a cross-sectional perspective view of a transmission wheel 10 for use within a continuously variable transmission (CVT) system. Transmission wheel 10 can include an outer circumference 12 which can be used to contact a drive wheel that can be directly or indirectly driven by an engine motor. Transmission wheel 10 can be moved along the drive wheel to increase and decrease the speed at which tires can be rotated in powered equipment in which the transmission system can be used, wherein the powered equipment can further include a housing and a handle for directing the equipment. Further, transmission wheel 10 may reverse the rotation of the tires of such power equipment. This variability of the transmission ratio can be accomplished by moving transmission wheel 10 along the surface of the drive wheel. As transmission wheel 10 is rotated by the contact between outer circumference 12 and the drive wheel, transmission wheel 10 rotates a shaft 20 that can indirectly drive an axle (or axles) on which the tires of the powered equipment can reside. Shaft 20 can have an outer surface 22 and can be cylindrical or at least mostly or substantially cylindrical in shape. Shaft 20 can have a cross-sectional shape that can be circular or at least mostly or substantially circular. Further, the shaft can have other cross-sectional shapes such as square, hexagonal, octagonal, non-symmetrical or the like. Transmission wheel 10 can include an axial bearing 30 at its core that can engage shaft 20. Axial bearing 30 can permit transmission wheel 10 to move along shaft 20 in lateral directions A and B to vary the transmission ratio within the CVT system. At the same time, axial bearing 30 can engage shaft 20 so as to transfer the torque created by the engagement of transmission wheel 10 to the drive wheel from transmission wheel 10 to shaft 20. Axial bearing 30 can be integral to wheel 10.

In order to engage shaft 20 with axial bearing 30, shaft 20 can have at least one groove 24 that can be defined within outer surface 22 of shaft 20. The at least one groove 24 can form an inner race 26 against which balls 32 of axial bearing 30 can reside. For example and without limitation, as shown in FIG. 1, shaft 20 can include four grooves 24 in which four sets of balls 32 of axial bearing 30 can at least partially reside. Although not shown in the sectional view of FIG. 1, any suitable type of retaining structure can be used to contain balls 32 within grooves 24. The shape and configuration of grooves 24 as defined by the races can be used as the retaining structure.

Axial bearing 30 can include an outer ring 34 that can define an outer race 36 against or in which balls 32 can also at least partially reside. Inner races 26 within shaft 20 and outer races 36 within outer ring 34 of axial bearing 30 can be aligned to together create bearing channels generally designated 38 in which balls 32 can be positioned and securely held. As transmission wheel 10 is rotated, outer ring 34 pushes against balls 32 within bearing channel 38. In turn, balls 32 press against shaft 20 within inner races 26 such that the torque generated by transmission wheel 10 is transferred to shaft 20. In this manner, balls 32 function similar to a key used on shafts to engage and drive gears. At the same time, balls 32 allow transmission wheel 10 to be movable along shaft 20 in lateral directions A and B. Inner races 26 of shaft 20 and outer races 36 of outer ring 34 of axial bearing 30 can be in close enough proximity to one another such that inner races 26 and outer races 34 contact balls 32. This proximity can aid in preventing balls 32 from slipping out of bearing channel 38. This proximity can also aid in permitting the transfer of the torque from transfer wheel 10 into shaft 20 without causing the balls 32 to jam bearing channel 38.

Figure 2A:
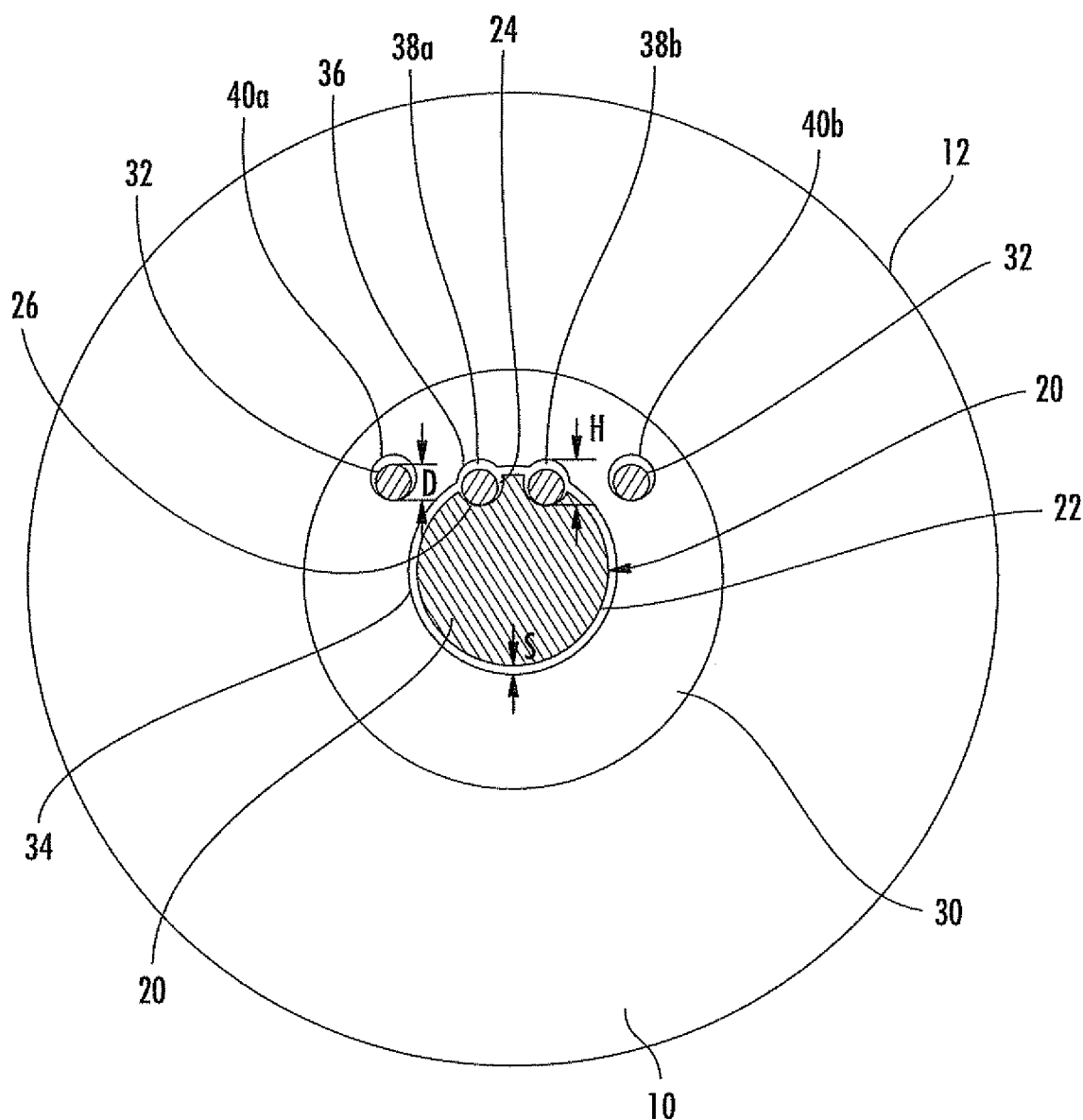
FIGS. 2A and 2B illustrate a cross sectional view along the length of the transmission wheel of two different but similar embodiments of a portion of a transmission wheel and shaft used within a CVT system according to the present disclosure.
Figure 2B:
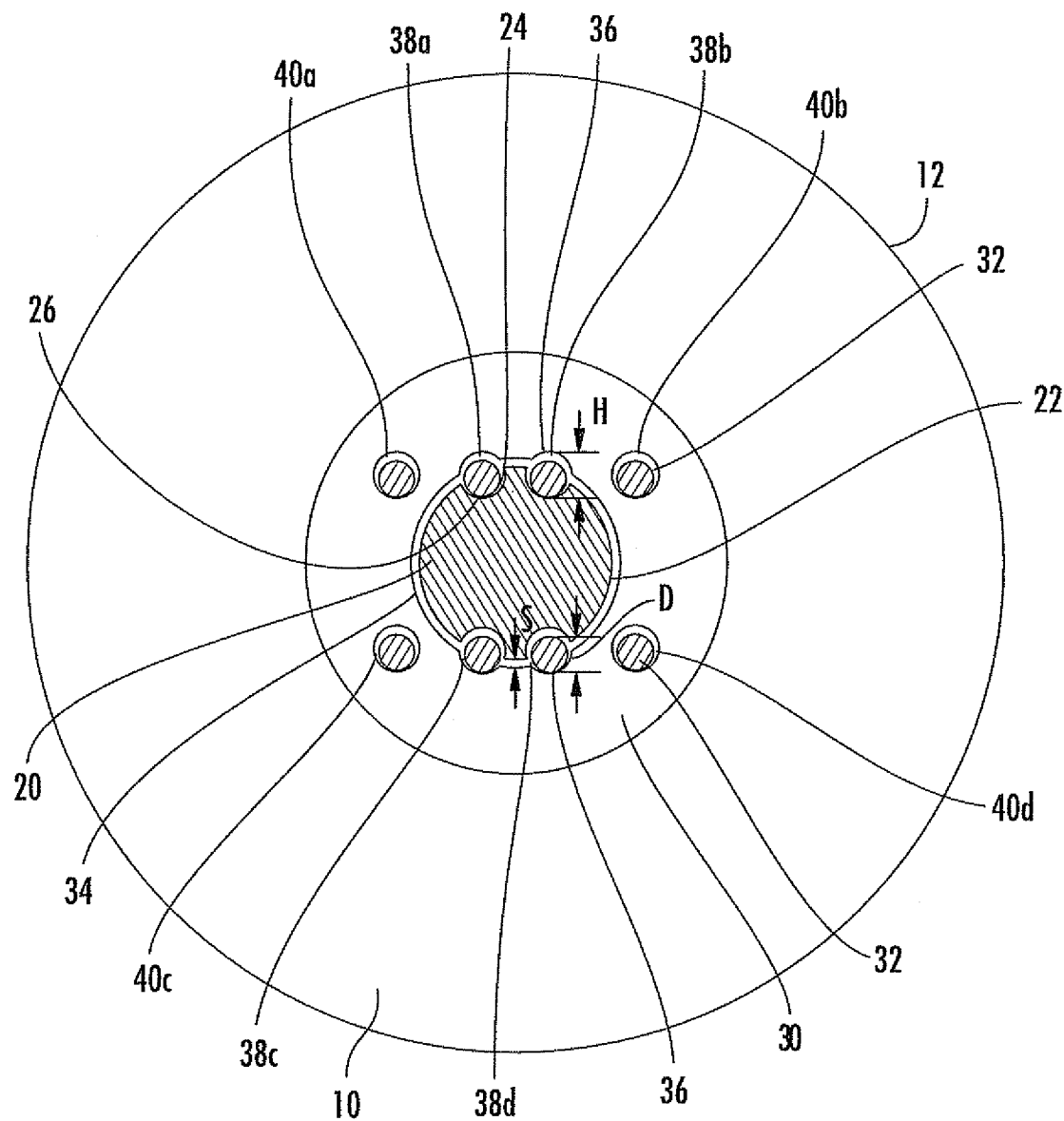
Figure 3:
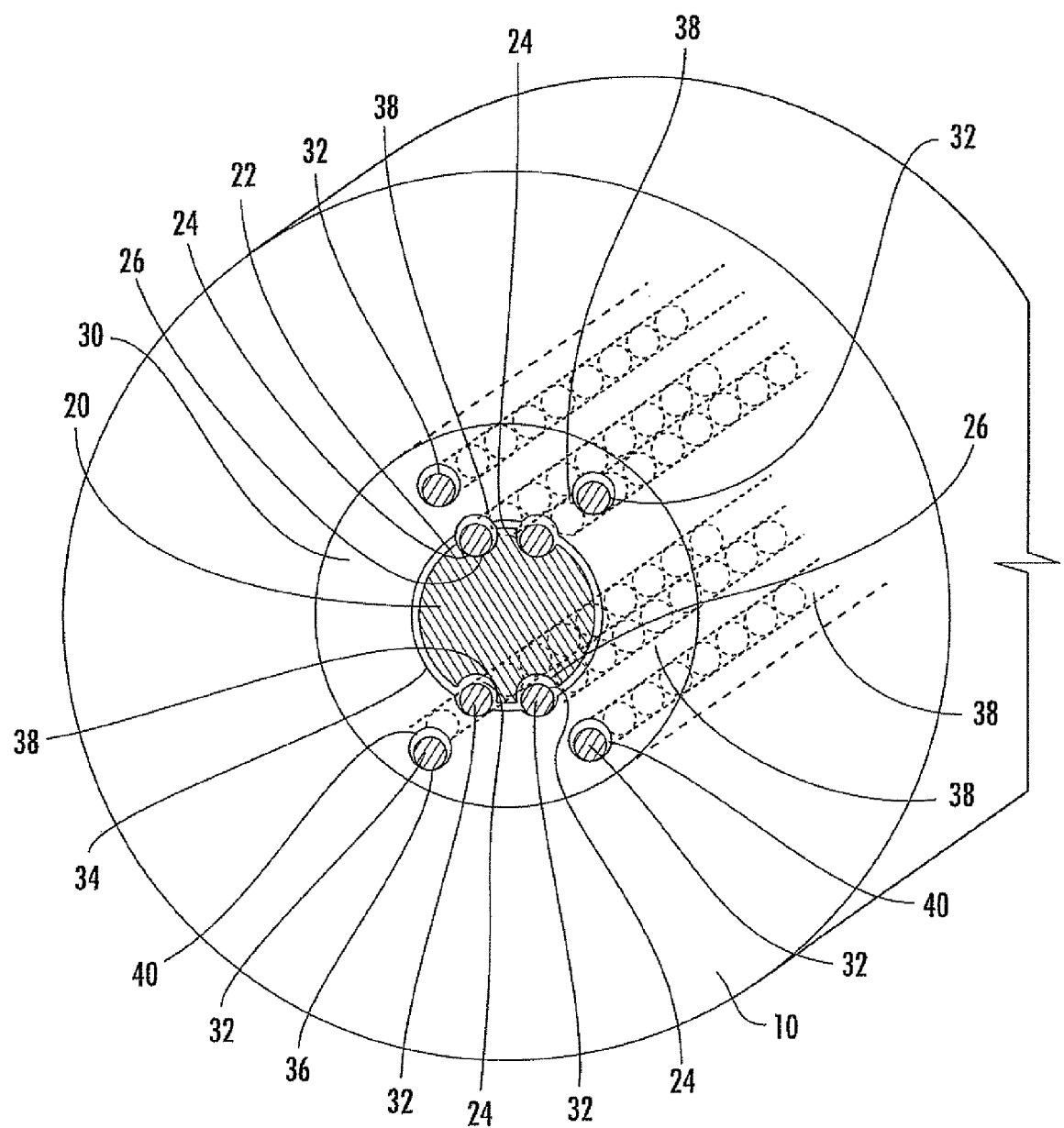
FIG. 3 illustrates a cross sectional perspective view of a further embodiment of a transmission wheel and shaft used within a CVT system according to the present disclosure.

FIGS. 2A, 2B and 3 illustrate further embodiments of a transmission wheel 10 and a shaft 20 for use within a CVT system. Shaft 20 can again include one or more grooves 24 within outer surface 22. Grooves 24 can have inner races 26 that can be defined by shaft 20. Transmission wheel 10 can include an axial bearing 30 that can provide one or more outer races 36. This structure can be aligned with the one or more inner races 26.

As shown in FIG. 2A, inner races 26 and outer races 36 can together form two separate bearing channels 38A, 38B. Outer ring 34 also can include two outer channels 40A, 40B that can run at least substantially parallel to their corresponding bearing channels 38A, 38B. Each bearing channel 38A, 38B can be in communication with its corresponding outer channel 40A, 40B such that balls 32 can rotate into a bearing channel 38A, 38B from its corresponding outer channel 40A, 40B, and balls 32 from bearing channel 38A, 38B can rotate into the corresponding outer channel 40A, 40B, respectively. For example, bearing channel 38A can be connected to outer channel 40A on either end such that bearing channel 38A and outer channel 40A can form a track in which the balls 32 contained therein can rotate through. Any suitable type of retaining structure can be used to contain balls 32 as they pass from bearing channel 38A, 38B into corresponding outer channel 40A, 40B, respectively. Such retaining structures can be formed at least partially or entirely by the configurations of the outer races and/or the inner races.

In this manner, balls 32 can rotate in one direction in the tracks formed between bearing channels 38A, 38B and outer channels 40A, 40B, respectively, when transmission wheel 10 travels along shaft 20 in one direction, while the bearings can rotate around these tracks in the opposite direction when transmission wheel 10 travels along shaft 20 in the other lateral direction. Balls 32 within the tracks can be free flowing. Balls 32 can be placed in close proximity to or against one another so that as transmission wheel 10 moves laterally along shaft 20, balls 32 rotate around the tracks formed by bearing channels 38A, 38B and outer channels 40A, 40B, respectively.

As discussed above, spacing S between shaft 20 and outer ring 34 of axial bearing 30 can be sized small enough to prevent balls 32 having a diameter D to pass between the spacing S. At the same time, bearing channels 38A, 38B can have a height H which can be great enough to allow the bearings to freely rotate within and through bearing channels 38A, 38B while permitting outer race 36 and inner race 26 to contact balls 32. In this manner, bearing channels 38A, 38B can engage with balls 32 in a rolling manner to facilitate movement of transmission wheel 10 along shaft 20.

In the embodiment shown, each track formed by bearing channels 38A, 38B and outer channels 40A, 40B, respectively, can be a closed track between the corresponding channels. Thus, the balls that rotate within bearing channel 38A and outer channel 40A, for example, do not mingle or interact with the balls contained within the track formed by bearing channel 38B and outer channel 40B. While not necessary, by having multiple bearing channels that permit balls 32 to engage shaft 20, greater torque may be transferred between the transfer wheel 10 and shaft 20 without fear of failure. Further, by having more balls 32 within each bearing channel 38A, 38B, the torque being transferred can be evenly distributed between the balls 32 such that less force is placed on each ball 32.

As shown in FIGS. 2B and 3 of the drawings, inner races 26 and outer races 36 can together form four separate bearing channels 38A, 38B, 38C, and 38D. Outer ring 34 also can include four outer channels 40A, 40B, 40C, and 40D that can run at least substantially parallel to their corresponding bearing channels 38A, 38B, 38C, and 38D. The embodiment of FIG. 3 shows outer channels 40A, 40B, 40C, and 40D being offset from bearing channels 38A, 38B, 38C, and 38D rather than substantially in alignment with them as shown in FIG. 2B. Each bearing channel 38A, 38B, 38C, 38D can be in communication with its corresponding outer channel 40A, 40B, 40C, 40D such that balls 32 can rotate into a bearing channel 38A, 38B, 38C, 38D from its corresponding outer channel 40A, 40B, 40C, 40D, and balls 32 from bearing channel 38A, 38B, 38C, 38D can rotate into the corresponding outer channel 40A, 40B, 40C, 40D, respectively. For example, bearing channel 38A can be connected to outer channel 40A on either end such that bearing channel 38A and outer channel 40A can form a track in which the balls 32 contained therein can rotate through. Any suitable type of retaining structure can be used to contain balls 32 as they pass from bearing channel 38A, 38B, 38C, 38D into corresponding outer channel 40A, 40B, 40C, 40D, respectively. Such retaining structures can be formed at least partially or entirely by the configurations of the outer races and/or the inner races.

In this manner, balls 32 can rotate in one direction in the tracks formed between bearing channels 38A, 38B, 38C, 38D and outer channels 40A, 40B, 40C, 40D, respectively, when transmission wheel 10 travels along shaft 20 in one direction, while the bearings can rotate around these tracks in the opposite direction when transmission wheel 10 travels along shaft 20 in the other lateral direction. Balls 32 within the tracks can be free flowing. Balls 32 can be placed in close proximity to or against one another so that as transmission wheel 10 moves laterally along shaft 20, balls 32 rotate around the tracks formed by bearing channels 38A, 38B, 38C, 38D and outer channels 40A, 40B, 40C, 40D, respectively.

As discussed above, spacing S between shaft 20 and outer ring 34 of axial bearing 30 can be sized small enough to prevent balls 32 having a diameter D to pass between the spacing S. At the same time, bearing channels 38A, 38B, 38C, 38D can have a height H which can be great enough to allow the bearings to freely rotate within and through channels 38A, 38B, 38C, 38D while permitting outer race 36 and inner race 26 to contact balls 32. In this manner, bearing channels 38A, 38B, 38C, 38D can engage with balls 32 in a rolling manner to facilitate movement of transmission wheel 10 along shaft 20.

In the embodiment shown, each track formed by bearing channels 38A, 38B, 38C, 38D and outer channels 40A, 40B, 40C, 40D, respectively, can be a closed track between the corresponding channels. Thus, the balls that rotate within bearing channel 38A and outer channel 40A, for example, do not mingle or interact with the balls contained within the track formed by bearing channel 38B and outer channel 40B. While not necessary, by having multiple bearing channels that permit balls 32 to engage shaft 20, greater torque may be transferred between the transfer wheel 10 and shaft 20 without fear of failure. Further, by having more balls 32 within each bearing channel 38A, 38B, 38C, 38D, the torque being transferred can be evenly distributed between the balls 32 such that less force is placed on each ball 32.

Figure 4:
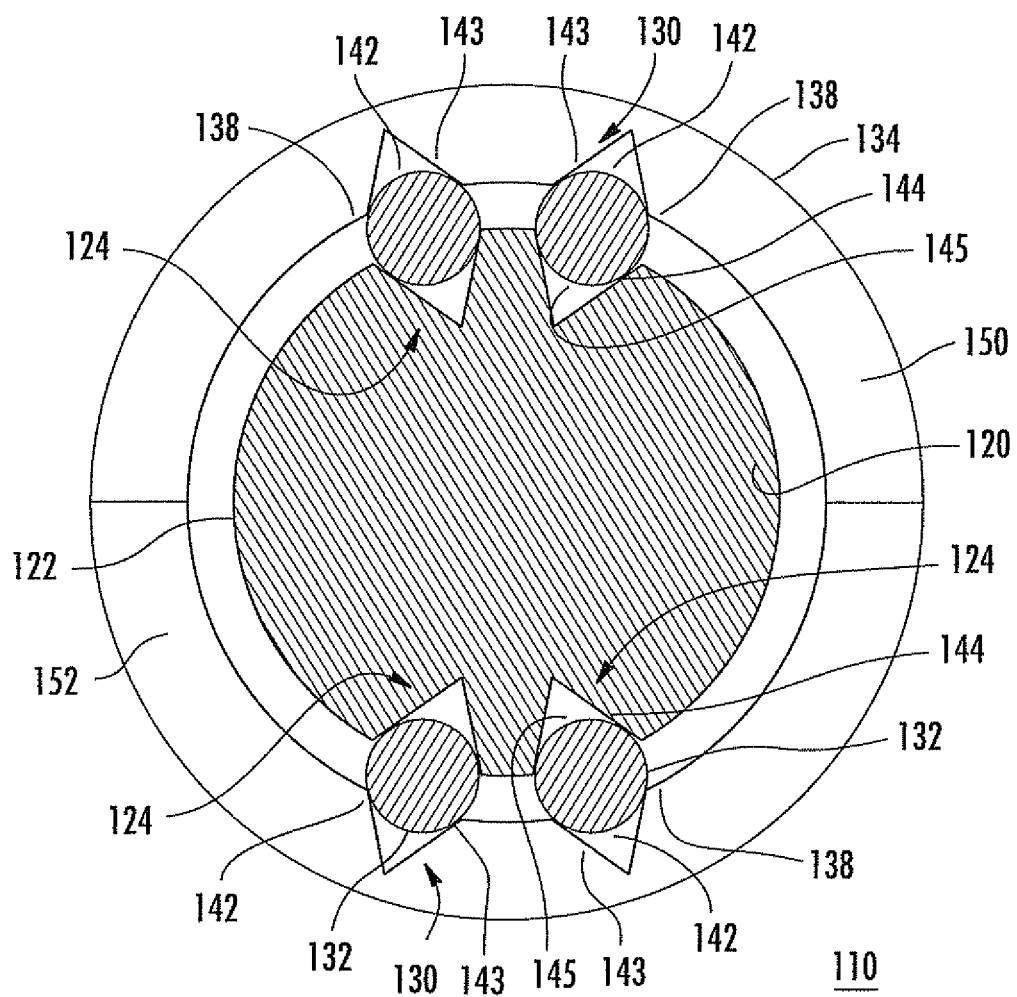
FIG. 4 illustrates a cross sectional view of a further embodiment of a portion of a transmission wheel of a CVT system according to the present disclosure.

FIG. 4 shows a cross-section of a further embodiment of a portion of a transmission wheel of a CVT system that can engage a shaft 120. Axial bearing 130 can have outer ring 134 that can define outer races 130 therein. Shaft 120 can also define corresponding inner races 124 within outer surface 122 of shaft 120. Outer races 130 can be aligned with inner races 122 to form bearing channels 138.

As shown in FIG. 4, balls 132 can contact inner races 124 and outer races 130 to allow transmission wheel 110 to move laterally along shaft 120 while also providing the mechanism for transmission wheel 110 to turn shaft 120 by having balls 132 contact both transmission wheel 110 and shaft 120 during rotation of the transmission wheel 110. As described above, the dimensions of the bearing channels can be such that the bearings can fully rotate within channel 138 while at the same time provide the link that transfers the torque from transmission wheel 110 to shaft 120 via a rotational moment. Inner races 124 and outer races 130 can be angled grooves formed within shaft 120 and transmission wheel 110, respectively. The angled grooves can be, for example, angled between about 70° and about 140°. For instance, the grooves can be angled at about 120°. Such grooves can contact balls 132, for example, at four points or areas. Balls 132 contact a first wall 142 and second wall 143 of outer races 130 and first wall 144 and second wall 145 of inner races 124. Such multiple contacts can increase the friction between balls 132, however, the multiples contacts on different sides of the balls secures balls 132 within channels 138 and can minimize any play or looseness that occurs between the transmission wheel and shaft 120.

As shown in FIG. 4, the outer ring 134 can have a first outer ring member 150 and a second outer ring member 152 that can be matingly engaged. Such members 150 and 162 can permit easier placement of balls 132 within races 124 and 130. First outer ring member 150 and second outer ring member 162 can be hinged to provide a clam shell-like structure for outer ring 134. Additionally, outer ring 134 can be a unitary piece.

Balls 132 can be each contained within their respective bearing channels 138 such that balls 132 remain within their respective channels 138 and are not in communication with other bearing channels 138. Balls 132 within each channel 138 can be spaced apart from one another by any suitable type of spacer or retainer to facilitate alignment of the balls 132 within each channel 138 and to prevent bunching of balls 132 during movement of the transmission wheel along shaft 120.

Figure 5:
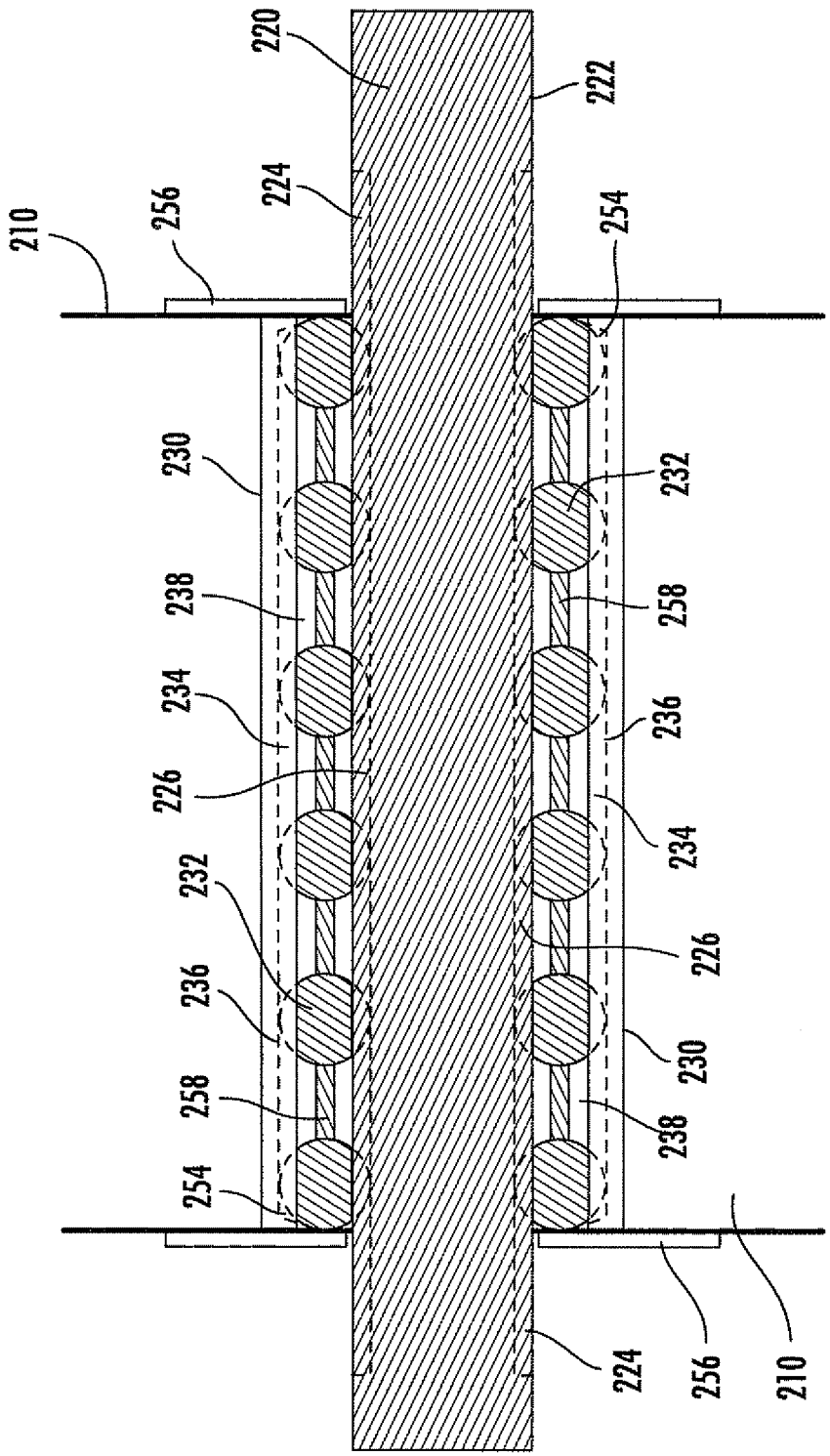
FIG. 5 illustrates a cross sectional view along the length of the shaft of the embodiment shown in FIG. 4.

FIG. 5 illustrates a cross-sectional view along the length of a shaft of a portion of another embodiment of a CVT system. The transmission wheel 210 is secured to a shaft 220. An outer surface 222 of shaft 220 can define grooves 224 along a portion of the shaft 220. Transmission wheel 210 can include axial bearing 230 that can provide a single set of balls 232 aligned substantially in a straight line that reside in each groove 224. Axial bearing 230 further includes an outer ring 234 that can define an outer race 236. Each outer race 236 can be aligned with a groove 224 within the shaft 220 such that balls 232 will be withheld in a bearing channel 238 defined by inner races 226 and outer races 236. End portions 254 of outer races 236 of axial bearing 230 can hold balls 232 within axial bearing 230. Further, axial bearing 230 can include one or more shields 256 or other structures to contain balls 232. Shields 256 are shown disposed on both ends of axial bearing balls 232 that are within inner race 226 and outer race 236. Each set of balls 232 can have the balls in the set maintained in a spaced-apart relationship, such as for example by securing the balls within a retainer 258 which spaces balls 232 apart and holds balls 232 at specific distances from one another while still allowing balls 232 to freely rotate. Retainer 258 can hold balls 232 in a substantially straight line and can prevent the balls from bunching together, while transmission wheel 210 moves laterally along shaft 220. Retainer 258 can provide enough space to allow balls 232 to fully rotate while still holding them at specific distances from one another. Retainer 258 can comprise of any type of spacer or linkage or cage that allows the balls to rotate while aligning the balls in a substantially straight line that parallels inner race 226 from within shaft 220. In this matter, a single set of balls 232 aligned in a straight line can be used to facilitate the movement of the transmission wheel 210 along shaft 220 while bearing channel 238 formed by inner race 226 and outer race 236 facilitates the transmission of the torque created on transmission wheel 210 as it is rotated on shaft 220. In such an embodiment, other bearings such as roller bearing can be used.

Figure 6:
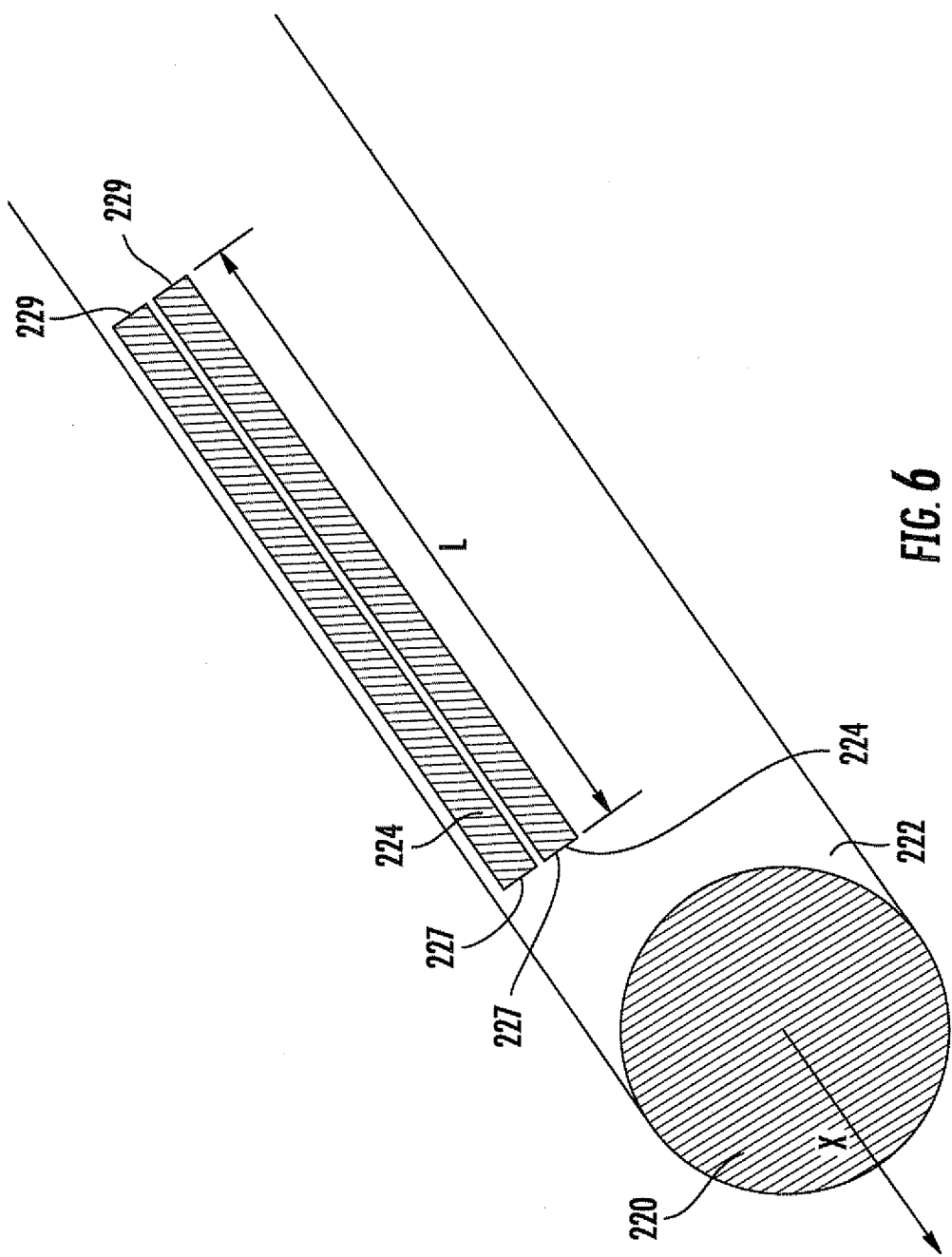
FIG. 6 illustrates a perspective view of a shaft for use within a CVT system.

FIG. 6 shows shaft 220 that can be used to indirectly drive an axle within a powered equipment apparatus. Shaft 220 can have one or more groves for positioning of balls, such as for example two grooves 224 that can be defined within the outer surface of shaft 220. Grooves 224 can run parallel to one another as well as parallel to an axis X of shaft 220. By having multiple grooves within shaft 220, the force required to transfer the torque from transmission wheel 110 to shaft 220 can be distributed over different sets of ball bearings and along different points along the shaft. For example, multiple grooves or set of grooves 224 can be positioned along shaft 220. Correspondingly, multiple outer races 236 can be defined within outer ring 234 of axial bearing 230 that are aligned with the grooves or sets of grooves 224. As the number of grooves increases, so do the number of balls that interact with transmission wheel 210 and shaft 220 to rotate shaft 220. As the number of ball bearings increases, the amount of force exerted on each ball to rotate the shaft 220 is decreased. In this manner, failure of the bearings due to an excessive amount of force applied against them is decreased.

Grooves 224 can have a length L along shaft 220 instead of extending the whole length of the shaft 220. First ends 227 and second ends 229 of grooves 224 prevent the balls, and thus the associated transmission wheel, from traveling past the respective ends 227, 229. In this manner, by limiting the length of the groove 224, the distance that transmission wheel 210 travels along shaft 220 can be limited. Further, a hard stop can be attached to shaft 220 that can prevent transmission wheel 210 from traveling past specific points on shaft 220. In such a manner, transmission wheel 210 can be prevented from traveling too far to either side of the drive wheel on which it runs. For example, the distance that transmission wheel 210 can travel on the side of the drive wheel which drives the tires in reverse can be limited by putting a hard stop closer to the axis of which the drive wheel spins. Thus, transmission wheel 210 can be prevented from traveling too far on the side of the drive wheel, which drives the transmission wheel in reverse to limit the amount of speed the power equipment will travel in reverse.

Figure 7:
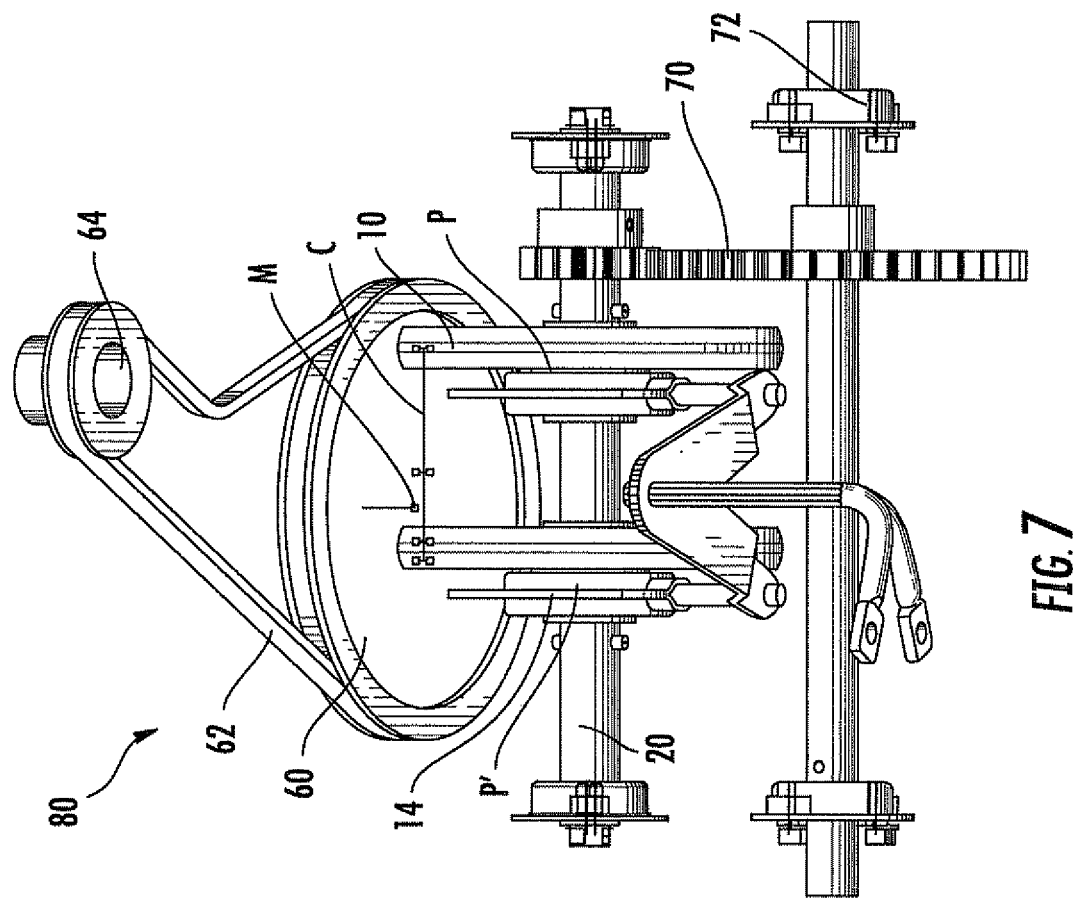
FIG. 7 illustrates a perspective view of a transmission system according to the present disclosure.

FIG. 7 shows a CVT system 80 within a power equipment apparatus such as, for example, a mower, tiller, snowmobile, and other motor driven apparatus. The CVT system 80 is driven by friction. The CVT system 80 illustrates a first wheel 60, which is a drive wheel that can be directly or indirectly rotated by an engine motor, and a second wheel 10, which can be a transmission wheel as described above. The second wheel is shown in two parallel positions P and P'. In the embodiment shown, first wheel 60 can be turned by belt 62 which is secured around pulley 64 that is rotated directly by the motor of the powered equipment apparatus. In this manner, first wheel 60 is rotated. Second wheel 10 can frictionally engage the first wheel such that the rotational movement of first wheel 60 as driven by the motor causes rotational movement of the second wheel 10. Second wheel 10 is moveable laterally along shaft 20. Second wheel 10 can be coupled to the shaft 20 such that the rotational movement of second wheel 10 causes rotational movement of shaft 20. As described above, the shaft 20 can include grooves that form inner races that are aligned with outer races formed within second wheel 10 such that balls can be secured between inner races of shaft 20 and the outer races of second wheel 10. The balls facilitate the lateral movement of second wheel 10 along shaft 20. At the same time, the balls facilitate the transfer of transferring the torque created between first and second wheels 60, 10 to shaft 20, thereby rotating shaft 20.

FIG. 7 shows second wheel 10 in a first forward drive position P and a reverse drive position P' along first wheel 60. First wheel 60 rotates about an axis M. Second wheel 10 can be moved along shaft 20 by engager 14. Second wheel 10 can travel along a centerline C on first wheel 60. Centerline C can intercept and run perpendicular to axis M of first wheel 60. When second wheel 10 is positioned by engager 14 along shaft 20 on the right side of axis M of first wheel 60 as shown in position P, first wheel 60 rotates second wheel 10 in a forward direction so that shaft 20 is rotated forward as well. This rotation causes gearing 70 to rotate axle 72 on which the tires of the powered equipment apparatus can be attached such that the tires rotate in a forward direction. In position P', second wheel 10 is in a position on the left side of axis M of first wheel 60. In this position, second wheel 10 rotates in an opposite direction from that in which it rotated when in position P such that second wheel 10 now rotates in a reverse direction. As second wheel 10 rotates in a reverse direction, shaft 20, through the bearing connection, rotates shaft 20 in a reverse direction which in turn rotates gears 70 in an opposite direction so that the axle (or axles) and the tires to which they are attached also rotate in a reverse direction. By moving second wheel 10 along shaft 20 and first wheel 60 between position P and position P', the transmission ratio can be continuously varied therebetween.

As second wheel 10 moves from position P toward axis M of first wheel 60, the speed of rotation of shaft 20 and thus axial 72 is slowed. Once second wheel 10 passes axis M of second wheel 60, shaft 20 will turn in the opposite (reverse) direction. By using the bearing system to couple second wheel 10 to shaft 20 while permitting second wheel 10 to laterally move along shaft 20 as described above, a continuous variable transmission system which does not require an excessive amount of lubrication can be created.

The embodiments of the present disclosure shown in the drawings and described above are exemplary of numerous embodiments that can be made within the scope of the appending claims. It is contemplated that the configurations of linearly adjustable torque transmission systems and methods can comprise numerous configurations other than those specifically disclosed. The scope of a patent issuing from this disclosure will be defined by the appended claims.

What is claimed is:

1. A linearly adjustable torque transmission system for a power driven machine, the system comprising:
   (a) a first wheel adapted to be rotatably driven;
   (b) a second wheel positioned proximate the first wheel and engaging the first wheel such that rotational movement of the first wheel imparts rotational movement to the second wheel; and
   (c) the second wheel being coupled to a shaft with bearings between the second wheel and the shaft such that the second wheel is movable along the shaft in a lateral direction along a line that intercepts and runs perpendicular to an axis about which the first wheel is rotatably driven to any of a plurality of parallel positions while the second wheel is coupled to the shaft wherein rotational movement of the second wheel rotationally moves the shaft, wherein the shaft comprises at least one groove defined on an outer surface of the shaft;
   wherein the second wheel and the shaft together define a first bearing channel, a second bearing channel, a third bearing channel, and a fourth bearing channel for engaging one or more ball bearings, the at least one groove of the shaft forming at least one inner race that defines at least one or more areas of the first bearing channel, the second bearing channel, the third bearing channel, and the fourth bearing channel for engaging one or more bearings in both a forward direction and a reverse direction, wherein the second wheel includes a first outer channel, a second outer channel, a third outer channel, and a fourth outer channel therein in communication with the first bearing channel, the second bearing channel, the third bearing channel, and the fourth bearing channel, respectively, to form a first track, a second track, a third track, and a fourth track through which the one or more ball bearings can rotate,
   wherein each of the first bearing channel, the second bearing channel, the first outer channel, and the second outer channel is aligned along a first plane that is parallel to but spaced apart from a center longitudinal axis of the shaft, and wherein each of the third bearing channel, the fourth bearing channel, the third outer channel, and the fourth outer channel is aligned along a second plane parallel to the first plane.

2. The linearly adjustable torque transmission system of claim 1 wherein the second wheel comprises an outer race that defines at least one or more areas of the first bearing channel and the second bearing channel for engaging one or more bearings.

3. The linearly adjustable torque transmission system of claim 1 wherein at least a portion of the shaft is substantially cylindrical in cross section.

4. The linearly adjustable torque transmission system of claim 1 wherein the second wheel includes an axial bearing having an outer ring defining at least one outer race therein, whereby the at least one outer race and the at least one inner race can be aligned to form the first bearing channel and the second bearing channel for housing one or more bearings.

5. The linearly adjustable torque transmission system of claim 4 wherein the movement of the second wheel is limited by at least one of a hard stop or a length of the inner race.

6. The linearly adjustable torque transmission system of claim 4 wherein the outer race contacts each bearing at two points and the inner race contacts each bearing at two points.

7. A power driven machine comprising:
(a) a housing; and
(b) a linearly adjustable torque transmission system positioned within the housing, the linearly adjustable torque transmission system comprising:
  (i) a first wheel adapted to be rotatably driven;
  (ii) a second wheel positioned proximate the first wheel and engaging the first wheel such that rotational movement of the first wheel imparts rotational movement to the second wheel; and
  (iii) the second wheel being coupled to a shaft with bearings between the second wheel and the shaft such that the second wheel is movable along the shaft in a lateral direction along a line that intercepts and runs perpendicular to an axis about which the first wheel is rotatably driven to any of a plurality of parallel positions while the second wheel is coupled to the shaft wherein rotational movement of the second wheel rotationally moves the shaft, wherein the shaft comprises at least one groove defined on an outer surface of the shaft;
wherein the second wheel and the shaft together define a first bearing channel, a second bearing channel, a third bearing channel, and a fourth bearing channel for engaging one or more ball bearings, the at least one groove of the shaft forming at least one inner race that defines at least one or more areas of the first bearing channel, the second bearing channel, the third bearing channel, and the fourth bearing channel for engaging one or more bearings in both a forward direction and a reverse direction, wherein the second wheel includes a first outer channel, a second outer channel, a third outer channel, and a fourth outer channel therein in communication with the first bearing channel, the second bearing channel, the third bearing channel, and the fourth bearing channel, respectively, to form a first track, a second track, a third track, and a fourth track through which the one or more ball bearings can rotate,
wherein each of the first bearing channel, the second bearing channel, the first outer channel, and the second outer channel is aligned along a first plane that is parallel to but spaced apart from a center longitudinal axis of the shaft, and wherein each of the third bearing channel, the fourth bearing channel, the third outer channel, and the fourth outer channel is aligned along a second plane parallel to the first plane.

8. The power driven machine of claim 7 wherein the second wheel of the linearly adjustable torque transmission system comprises an outer race that defines at least one or more areas of the first bearing channel and the second bearing channel for engaging one or more bearings.

9. The power driven machine of claim 7 wherein at least a portion of the shaft is substantially cylindrical in cross section.

10. A linearly adjustable torque transmission method comprising:
(a) rotatably driving a first wheel of a transmission assembly where rotational movement of the first wheel imparts rotational movement to a second wheel positioned proximate the first wheel;
(b) moving the second wheel along a shaft in a lateral direction along a line that intercepts and runs perpendicular to an axis about which the first wheel is rotatably driven to one of a plurality of parallel positions proximate the first wheel with bearings between the second wheel and the shaft, wherein the shaft comprises at least one groove defined on an outer surface of the shaft, wherein the second wheel and the shaft together define a first bearing channel, a second bearing channel, a third bearing channel, and a fourth bearing channel for engaging one or more ball bearings, the at least one groove of the shaft forming at least one inner race that defines at least one or more areas of the first bearing channel, the second bearing channel, the third bearing channel, and the fourth bearing channel for engaging one or more bearings in both a forward direction and a reverse direction, wherein the second wheel includes a first outer channel, a second outer channel, a third outer channel, and a fourth outer channel therein in communication with the first bearing channel, the second bearing channel, the third bearing channel, and the fourth bearing channel, respectively, to form a first track, a second track, a third track, and a fourth track through which the one or more ball bearings can rotate, wherein each of the first bearing channel, the second bearing channel, the first outer channel, and the second outer channel is aligned along a first plane that is parallel to but spaced apart from a center longitudinal axis of the shaft, and wherein each of the third bearing channel, the fourth bearing channel, the third outer channel, and the fourth outer channel is aligned along a second plane parallel to the first plane; and
(c) rotationally moving the second wheel where its coupling to the shaft causes the shaft to also rotationally move.

11. The linearly adjustable torque transmission method of claim 10, wherein the first bearing channel and the second bearing channel each comprise an outer race within the second wheel for engaging one or more bearings.

12. The linearly adjustable torque transmission method of claim 11, further comprising limiting the moving of the second wheel along the shaft by at least one of the end of the inner race or by a hard stop.

13. The linearly adjustable torque transmission method of claim 10, further comprising rotating the bearings within the first bearing channel and the second bearing channel defined between the second wheel and the shaft.

* * * * *

UNITED STATES PATENT AND TRADEMARK OFFICE
CERTIFICATE OF CORRECTION

PATENT NO. : 8,568,269 B2  
APPLICATION NO. : 11/868347  
DATED : October 29, 2013  
INVENTOR(S) : McDaniel Page 1 of 1

It is certified that error appears in the above-identified patent and that said Letters Patent is hereby corrected as shown below:

On the Title page: Item 75
Replace the inventor name "Christipher"
with --Christopher--

Signed and Sealed this
Tenth Day of December, 2013

Margaret A. Focarino
*Commissioner for Patents of the United States Patent and Trademark Office*